Feb. 23, 1960 H. E. HOLLMANN 2,926,219
METHOD AND APPARATUS FOR MAKING DUPLICATE MAGNETIC RECORDS
Filed Nov. 7, 1952
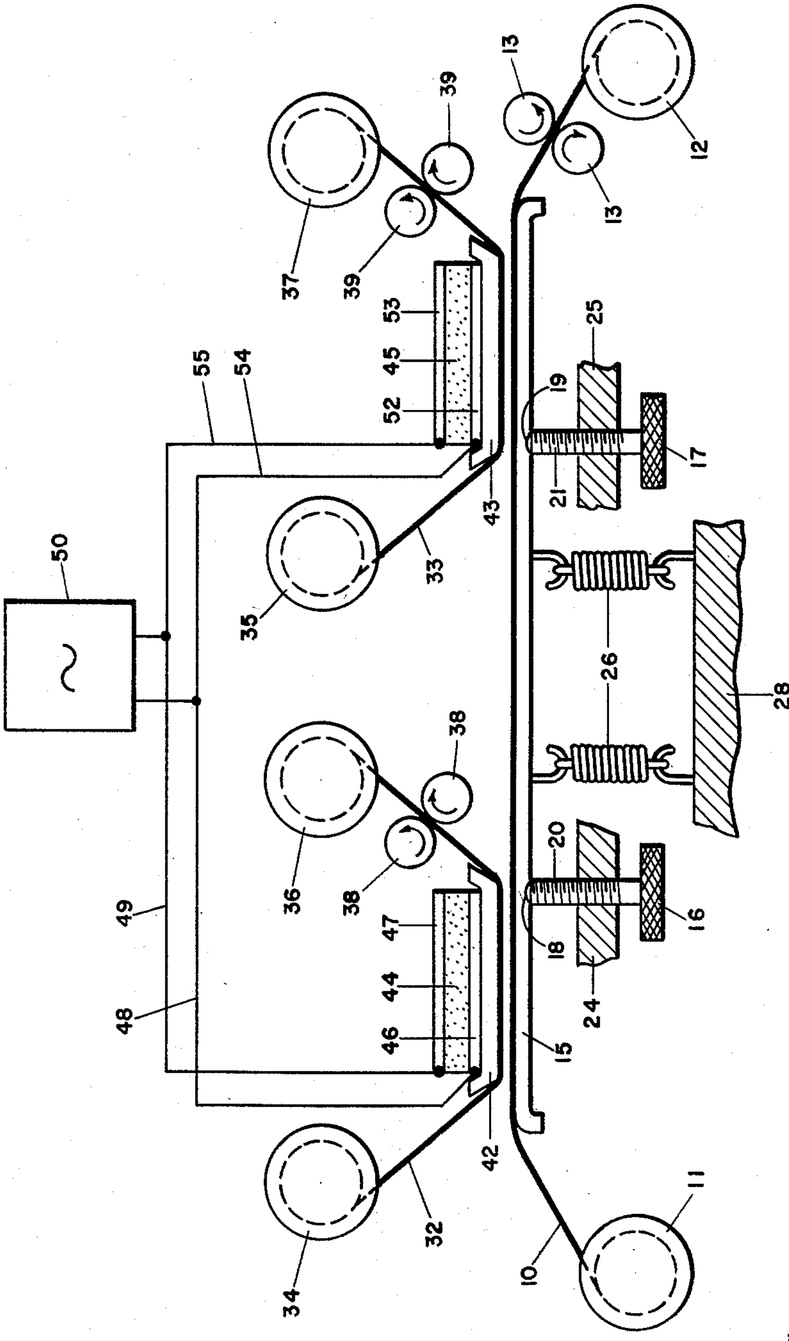
INVENTOR.
HANS E. HOLLMANN
BY [signature]
[signature]
ATTORNEYS United States Patent Office 2,926,219

Patented Feb. 23, 1960

2,926,219

METHOD AND APPARATUS FOR MAKING DUPLICATE MAGNETIC RECORDS

Hans E. Hollmann, Oxnard, Calif.

Application November 7, 1952, Serial No. 319,441

5 Claims. (Cl. 179—100.2)

(Granted under Title 35, U.S. Code (1952), sec. 266)

The invention described herein may be manufactured and used by or for the Government of the United States of America for governmental purposes without the payment of any royalties thereon or therefor.

The present invention relates to a method and apparatus for making duplicate magnetic records and more particularly to a method and apparatus for making duplicate magnetic records wherein ultrasonic vibrations are induced in a magnetizable record blank which is disposed closely adjacent to a magnetized master record, whereby there is produced on the record blank a magnetic trace corresponding to the magnetic trace existing on the signal track of the master magnetic record.

Heretofore, duplicate magnetic records have been produced by moving a master record between the poles of a conventional playback head the output of which is connected to the input of an amplifier, while the blank record is moved between the poles of a conventional recording head which is connected to the output of said amplifier. Accordingly, a separate amplifier and recording head is required for each blank record on which it is desired to duplicate the magnetic trace of the master record. Furthermore, since the output of the playback head is connected to the input of an amplifier, the master record must be moved between the poles of the playback head at the usual operating speed for reproduction of the signals, since at other speeds distortion of the signals will occur in the amplifier of the system. It is therefore evident that duplicating systems presently used have the disadvantages of requiring separate amplifiers and recording heads for each duplicate record to be produced, consequently requiring cumbersome and expensive equipment, particularly when it is desired to mass produce duplicate records, and in addition the speed at which duplicate records may be produced is limited by the conventional operating speed for reproducing the signals recorded on the master record.

The present invention utilizes the effect of ultrasonic vibrations by disposing the magnetizable blank closely adjacent to the magnetic master record and inducing ultrasonic vibrations of the record blank whereby the magnetic trace of the master record is duplicated on the record blank. Accordingly, the present invention requires only a single source of electrical energy, and a number of ultrasonic emitters corresponding to the number of duplicate records to be produced may be connected to said source. The necessity of a playback head and separate amplifiers and recording heads for each blank record as required in present duplicating systems is thereby eliminated, and since the present invention requires only a single source of electrical energy and the ultrasonic emitters are structurally simple and may be inexpensively produced, it is apparent that the equipment required according to the present invention is less cumbersome and cheaper than that required in present systems. Moreover, since in the present invention there is no problem of distortion of the signals in an amplifier, the speed at which the duplicate records may be produced is not limited by the conventional operating speed for reproducing the signals recorded on the master record, and therefore the duplication may be accomplished at greater speeds than are possible using known methods and apparatus.

An object of the present invention is to provide a new and novel method and apparatus for making duplicate magnetic records.

Another object is to provide a method and apparatus for making duplicate magnetic records at high speeds.

Still another object is to provide a method and apparatus for making duplicate magnetic records without the necessity of utilizing a playback head and separate amplifiers and recording heads for each duplicate record.

A further object is to provide an apparatus for making duplicate magnetic records which is simple and inexpensive in construction, yet accurate and efficient in operation.

Other objects and many of the attendant advantages of this invention will be readily appreciated as the same becomes better understood by reference to the following detailed description when considered in connection with the accompanying drawing which illustrates a preferred embodiment of the invention.

Referring to the drawing, a magnetized master record 10 is shown in the form of a tape which is adapted to be unwound from storage reel 11 onto take-up reel 12 when actuated by the driving rollers 13 which are adapted to be driven in the direction of the arrows by any suitable means such as a synchronous motor or the like. The master record is supported and guided by an elongated guide means 15 which is supported by four identical adjusting screws, only two of which, 16 and 17, are shown. The other two screws are similarly disposed with respect to member 15 opposite screws 16 and 17, which are shown as having rounded heads adapted to seat in mating pockets 18 and 19 formed in member 15. The threads 20 and 21 on screws 16 and 17 are fine microthreads which cooperate with corresponding threads formed in any suitable support means 24 and 25, respectively, thereby enabling minute adjustments in the position of the screws. Member 15 is biased toward the screws by means of a plurality of tension springs 26 shown as two in number, which are adapted to be secured to any suitable fixed support 28. It is therefore evident that by adjusting the setting of the screws, guide means 15 may be adjusted to a desired position.

The record blanks upon which it is desired to duplicate the magnetic trace existing on the master record are shown as two in number and consist of conventional magnetizable tapes 32 and 33 which are respectively adapted to be unwound from storage reels 34 and 35 onto takeup reels 36 and 37 when the tapes are actuated by the driving rollers 38 and 39 which are adapted to be driven in the direction of the arrows by any suitable driving means. It should be noted that the driving rollers, 13, 38 and 39 should be driven in synchronism in order that the master record and record blanks will be driven at the same speed. Record blanks 32 and 33 are guided and supported by guide members 42 and 43 which are fixed in position and respectively support piezoelectric crystals 44 and 45 mounted thereon.

The crystal 44 has secured to its opposite faces electrodes 46 and 47 which are connected by means of leads 48 and 49 to the output terminals of a high frequency generator 50 which may be a beat frequency generator, a phase-shift oscillator, or the like. The crystal 45 has secured to its opposite faces electrodes 52 and 53, which are connected to the output terminals of generator 50 by means of leads 54 and 55. The oscillating voltage produced by generator 50 when impressed across the opposite faces of the piezoelectric crystals is adapted to cause vibrations of the crystals in a well known manner, and the oscillating frequency of generator 50 is such as to produce ultrasonic vibrations of the piezoelectric crystals 44 and 45 which thereby become ultrasonic emitters. Since the crystals 44 and 45 are respectively secured to the guide means 42 and 43, and the record blanks are guided and supported by said guide means, the ultrasonic vibrations of the crystals will be transmitted to the record blanks through the intermediary of the guide means and in this manner ultrasonic vibrations will be produced in that portion of the record blanks which is in contact with the associated guide means.

When the magnetizable record blanks are caused to vibrate at ultrasonic frequencies, the coerciveness of the magnetic material, e.g. iron particles, which is deposited on the record is substantially reduced and the record thereby becomes very sensitive and susceptible to change when influenced by a magnetic field. Therefore, by passing the magnetic master record closely adjacent to the magnetizable record blank, the weak magnetic field produced by the magnetic trace existing on the signal track of the master record is enabled to induce a corresponding magnetic trace on the record blanks. In order that the weak field produced by the master record may be effective to produce a corresponding magnetic trace on the record blanks, the master record must be disposed such that it will pass as closely as possible to that portion of the record blanks in which the ultrasonic vibrations are produced without contacting the blanks. It is apparent that the position of the master record with respect to the record blanks and consequently the size of the air gap therebetween may be adjusted by moving the guide member 15 toward and away from guide members 42 and 43 by means of the adjusting screws. The air gap existing between the master record and the record blanks may be of the order of several microns.

Any suitable means may be employed for adjusting the position of member 15, provided that its position may be altered in sufficiently small increments and that it will be maintained rigidly in position when such adjustments have been made. Accordingly, the size of the air gap may also be adjusted by other suitable means such as by fixing member 15 in position and providing means for moving the guide members 42 and 43 toward and away from member 15.

It should be understood that an air gap will form a complete insulation to ultrasonic vibrations and that the air gap existing between the master record and the record blanks will prevent such vibrations from impinging on the master record even through the air gap is microsopically small. In this manner, the ultrasonic vibrations produced by the emitters of the present invention are prevented from affecting the signal track of the master tape, thereby enabling the master tape to be repeatedly duplicated without affecting the magnetic trace thereon.

It is obvious that any number of record blanks may be simultaneously recorded from the master record of the present invention and that the record blanks have been shown as two in number merely for the purpose of illustration. If it were desired to duplicate more tnan two records simultaneously, it would only be necesasry to extend the guide member 15 and provide additional guide means and ultrasonic emitters for the additional record blanks. Each of the emitters may be connected to generator 50. It should be noted that other forms of ultrasonic emitters may be employed such as magnetrostriction oscillators or the like, provided that the vibrations of the emitter are transferred to the record blanks by suitable means.

From the foregoing, it may be seen that a method of making duplicate magnetic records is provided wherein successive portions of a magnetizable record blank are disposed closely adjacent to successive portions of a magnetic master record and ultrasonic vibrations are produced in that portion of the record blank which is disposed adjacent to the master record. In this manner, a magnetic trace is produced on the record blank corresponding to the magnetic trace on the master record.

The operation of the device as shown in the drawing is as follows: Driving rollers 13, 38 and 39 will continuously rotate in synchronism, thereby causing successive portions of the master record 10 and the record blanks 32 and 33 to be disposed closely adjacent to one another along predetermined paths as determined by the positioning of the respective guide means 15, 42 and 43. The generator 50 produces continuous ultrasonic vibrations of the crystal emitters 44 and 45 which in turn induce ultrasonic vibrations in those portions of the record blanks which are in contact with the respective guide means. The air gap existing between the master record and the record blanks prevents the ultrasonic vibrations from impinging upon the master record, and the ultrasonic vibrations produced in the record blanks reduce the coerciveness of the magnetic material thereon to such an extent that the magnetic field produced by the master tape produces a magnetic trace on the record blanks corresponding to the trace on the master record. The size of the air gap may be adjusted to the optimum operating size by adjusting the position of guide means 15 by means of the adjusting screws.

From the foregoing, it is apparent that there is provided a new and novel method and apparatus for making duplicate magnetic records at high speeds without the necessity of utilizing a playback head and separate amplifiers and recording heads for each record blank, and that the apparatus is simple and inexpensive in construction, yet accurate and efficient in operation.

Obviously many modifications and variations of the present invention are possible in the light of the above teachings. It is therefore to be understood that within the scope of the appended claims the invention may be practiced otherwise than as specifically described.

I claim:

1. Apparatus for making duplicate magnetic records which comprises a magnetized master record means, at least one magnetizable record blank means, means associated with each of said record means to dispose successive portions of said magnetizable record means closely adjacent to successive portions of said master magnetic record means, the adjacent portions of said two record means being separated by an air gap and means to produce ultrasonic vibrations of said magnetizable record means, said air gap acting to isolate said master record means from the effect of such vibrations.

2. Apparatus for making duplicate magnetic records which comprises a magnetized master record means, at least one magnetizable record blank means, driving means to move said magnetic master record means, a first guide means to guide said magnetic master record means along a predetermined path, driving means to move said magnetizable record means, a second guide means adapted to guide said magnetizable record means along a predetermined path such that a small air gap is defined between corresponding portions of said magnetized record means and said magnetizable record means, positioning means to adjust the position of one of said guide means relative to the other of said guide means for varying the air gap, and means to produce ultrasonic vibrations of said magnetizable record means, said air gap acting to isolate said master record means from the effect of such vibrations.

3. Apparatus for making duplicate magnetic records which comprises a magnetized master record means, at least one magnetizable record blank means, a first driving means to move said magnetized master record means, a first guide means to guide said magnetized master record means, a second driving means to move said magnetizable record means, a second guide means to guide said magnetizable record means in oppositely-disposed relation to said master record means such that a small air gap is defined between corresponding portions of said magnetized record means and said magnetizable record means, said first and second driving means operating in timed relationship, means to adjust the position of said first guide means relative to said second guide means to vary the width of the air gap, a piezoelectric crystal fixed to said second guide means, and means connected to said crystal to cause ultrasonic vibrations thereof whereby ultrasonic vibrations are produced in said magnetizable record means but not in said master record means.

4. Apparatus for making duplicate magnetic records which comprises a magnetized master record means, a guide means for supporting said master record means, a driving means for moving said master record means over said guide means, a plurality of magnetizable record blank means, a plurality of guide means each supporting one of said record blank means in laterally disposed spaced relation, a driving means for each of said record blank means for moving said record blank means over said respective guide means, said master record guide means being common to all of said record blank guide means and supporting said master record means such that a small air gap is defined between adjacent portions of said master record means and said plurality of record blank means, means for selectively adjusting the position of one of said guide means relative to the other of said guide means for varying the air gap therebetween, and means to produce ultrasonic vibrations of each of said record blank means, said air gap preventing such ultrasonic vibrations from reaching said master record means.

5. The method of transferring information from a magnetized tape to an originally unmagnetized tape which includes the steps of synchronously guiding the movement of both tapes so that they are in closely-adjacent face-to-face relation but separated from one another by an air gap during their passage through a region where the said information is to be transferred, and then inducing ultrasonic vibrations in the originally unmagnetized tape during its passage through the said transfer region while said magnetized tape is isolated from the effect of such vibrations by the presence of said air gap.

References Cited in the file of this patent

UNITED STATES PATENTS

| | | |
|---|---|---|
| 1,477,847 | Palmer | Dec. 18, 1923 |
| 2,587,593 | Camras | Mar. 4, 1952 |
| 2,738,383 | Herr | Mar. 13, 1956 |

OTHER REFERENCES

Publication I, Bulletin of the Bureau of Standards, No. 78, pages 264–270, by C. W. Burrows, September 3, 1907.

Publication II, "Duplicating Magnetic Tape by Contact Printing," by M. Camras and R. Herr, pages 78–83 of Electronics Magazine, December 1949, vol. 22, No. 12.